(12) United States Patent
He et al.

(10) Patent No.: US 12,443,659 B2
(45) Date of Patent: Oct. 14, 2025

(54) SESSION RECOMMENDATION METHOD, DEVICE AND ELECTRONIC EQUIPMENT

(71) Applicant: Beijing Baidu Netcom Science and Technology Co., Ltd., Beijing (CN)

(72) Inventors: Tianjian He, Beijing (CN); Yi Liu, Beijing (CN); Daxiang Dong, Beijing (CN); Yanjun Ma, Beijing (CN); Dianhai Yu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 1177 days.

(21) Appl. No.: 17/279,377

(22) PCT Filed: Jun. 9, 2020

(86) PCT No.: PCT/CN2020/095120
§ 371 (c)(1),
(2) Date: Mar. 24, 2021

(87) PCT Pub. No.: WO2021/114590
PCT Pub. Date: Jun. 17, 2021

(65) Prior Publication Data
US 2022/0114218 A1  Apr. 14, 2022

(30) Foreign Application Priority Data
Dec. 9, 2019 (CN) .................. 201911252600.6

(51) Int. Cl.
*G06F 16/901* (2019.01)
*G06F 9/30* (2018.01)
*G06N 3/08* (2023.01)

(52) U.S. Cl.
CPC ...... *G06F 16/9024* (2019.01); *G06F 9/30036* (2013.01); *G06F 16/9017* (2019.01); *G06N 3/08* (2013.01)

(58) Field of Classification Search
None
See application file for complete search history.

(56) References Cited

U.S. PATENT DOCUMENTS

2016/0306798 A1   10/2016  Guo et al.
2017/0031920 A1*  2/2017  Manning ............... G06F 16/904
(Continued)

FOREIGN PATENT DOCUMENTS

CN   109816101 A   5/2019
CN   110119467 A   8/2019
(Continued)

OTHER PUBLICATIONS

International Search Report corresponding to Chinese Patent Application No. PCT2000209CN, dated Sep. 4, 2020 (9 pages).
(Continued)

*Primary Examiner* — Haimei Jiang
(74) *Attorney, Agent, or Firm* — Maginot, Moore & Beck LLP (57) ABSTRACT

A session recommendation method, a device and an electronic device are provided, related to the field of graph neural network technology. The session recommendation method includes: acquiring a session control sequence, and acquiring a first embedding vector matrix based on an embedding vector of each of items in the session control sequence; generating a position information sequence based on an arrangement sequence of the items in the session control sequence, and acquiring a second embedding vector matrix based on an embedding vector of each piece of position information in the position information sequence; determining a target embedding vector matrix based on the first embedding vector matrix and the second embedding vector matrix; and determining a recommended item, based
(Continued)

on the target embedding vector matrix and through a Session-based Recommendation Graph Neural Network.

7 Claims, 3 Drawing Sheets

(56) References Cited

U.S. PATENT DOCUMENTS

| | | | | |
|---|---|---|---|---|
| 2019/0251435 A1* | 8/2019 | Shiebler | ................ | G06N 3/084 |
| 2019/0294970 A1 | 9/2019 | Fidler et al. | | |
| 2022/0188899 A1* | 6/2022 | Malhotra | ................ | G06N 3/04 |

FOREIGN PATENT DOCUMENTS

| | | | | |
|---|---|---|---|---|
| CN | 110232480 A | | 9/2019 | |
| CN | 110245787 A | | 9/2019 | |
| CN | 110490717 A | | 11/2019 | |
| CN | 110633421 A | * | 12/2019 | ......... G06F 16/9536 |
| CN | 111046257 A | | 4/2020 | |

OTHER PUBLICATIONS

Written Opinion corresponding to Chinese Patent Application No. PCT2000209CN, dated Sep. 4, 2020 (2 pages).
Session-based Recommendation with Graph Neural Networks. Shu Wu, et al. Nov. 15, 2018. (9 pages) arXiv:1811.00855v3 [cs.IR].
Graph Based Neural Network Regression Strategy for Facial Image Super-Resolution. Huyan Kang, et al. Apr. 29, 2018. (12 pages) http://www.cnki.net.
The Recommendation Method of Graph Neural Network Based on Three-Way Decision. Computer Engineering and Applications. Li Xian, et al. Nov. 15, 2019. (11 pages) https://kns.cnki.net/kcms/detail/11.2127.TP.20191115.1302.008.html.
Zhang Zhongwei, Cao Lei, Chen Xiliang, Kou Dalei, Song Tianting. Survey of Knowledge Reasoning Based on Neural Network. Computer Engineering and Applications, 2019, 55(12): 8-19.
Acharya, Deepak Bhaskar, and Huaming Zhang. "Feature selection and extraction for graph neural networks." Proceedings of the 2020 ACM Southeast Conference. 2020.
Chinese Office Action corresponding to Chinese Patent Application No. 201911252600.6, dated Feb. 7, 2023. (6 Pages).
English Translation of Chinese Office Action corresponding to Chinese Patent Application No. 201911252600.6, dated Feb. 7, 2023. (1 Page).
Machine Translation of CN110232480A. (27 Pages).
Machine Translation of CN110245787A. (36 Pages).

* cited by examiner

SESSION RECOMMENDATION METHOD, DEVICE AND ELECTRONIC EQUIPMENT

CROSS REFERENCE OF RELATED APPLICATION

The present application is the U.S. national phase of PCT Application PCT/CN2020/095120 filed on Jun. 9, 2020, which claims a priority of Chinese patent application No. 201911252600.6 filed on Dec. 9, 2019, which is incorporated herein by reference in its entirety.

TECHNICAL FIELD

The present disclosure relates to the field of graph neural network technology in computer technologies, and in particular, to a session recommendation method, a device and an electronic device.

BACKGROUND

In the Session-based Recommendation of sessions Graph (SR-GNN) technique, each Session control (Session) is modeled as a directed graphic, where each node in the graphic represents an item. A vector of each node is used for indicating an embedding vector of the item corresponding to the node. Based on the vector representation of the node in the directed graph, each Session may be modeled as an embedding vector (embedding), the probability value of each candidate item is determined according to the embedding vector, and the probability of each candidate item is determined based on the embedding vector, and then the item which may be selected by the user in the later period is recommended according to the probability.

In the related art, when the sessions are modeled, one directed graph may correspond to multiple Session sequences, and in the SR-GNN in the related art may regard all Session sequences corresponding to one directed graph as same Session sequence for analysis, so the accuracy of the recommendation result of the SR-GNN is low.

SUMMARY

The embodiment of the disclosure provides a session recommendation method, a device and an electronic device, so as to solve the problem that in the related art that the accuracy of the recommendation result is low in SR-GNN.

In a first aspect, a session recommendation method is provided in an embodiment of the present disclosure, including:
  acquiring a session control sequence, and acquiring a first embedding vector matrix based on an embedding vector of each of items in the session control sequence;
  generating a position information sequence based on an arrangement sequence of the items in the session control sequence, and acquiring a second embedding vector matrix based on an embedding vector of each piece of position information in the position information sequence;
  determining a target embedding vector matrix based on the first embedding vector matrix and the second embedding vector matrix; and
  determining a recommended item, based on the target embedding vector matrix and through a Session-based Recommendation Graph Neural Network (SR-GNN).

The embodiment in the above disclosure has the following advantages or benefits: the accuracy of the item recommended through the SR-GNN may be improved. By generating the position information corresponding to the arrangement sequence of the items in the session control sequence and obtaining the target embedding vector matrix according to the embedding vector matrix of the position information and the embedding vector matrix of the corresponding item, a plurality of target embedding vector matrices corresponding to the same vector diagram may be distinguished, so that the defect of low accuracy of the item recommended through the SR-GNN caused by the fact that the plurality of embedding vector matrices corresponding to the same vector diagram are regarded as the same embedding vector matrix is overcome, and the accuracy of the item recommended through the SR-GNN may be improved.

Optionally, the determining the recommended item based on the target embedding vector matrix and through the SR-GNN includes:
  summing the first embedding vector matrix and the second embedding vector matrix to obtain the target embedding vector matrix; or
  splicing the first embedding vector matrix and the second embedding vector matrix to obtain the target embedding vector matrix, where a dimension of the embedding vector corresponding to each item in the target embedding vector matrix is twice a dimension of the embedding vector corresponding to each item in the first embedding vector matrix.

The first embedding vector matrix and the second embedding vector matrix are processed in a summing or splicing mode, the embedding vector of each item can be changed according to the embedding vector of the position information in the second embedding vector matrix, and the position information sequence is generated according to the arrangement sequence of the items in the session control sequence, so that the embedding vector corresponding to each item in the obtained target embedding vector matrix is associated with the position of the embedding vector, so it is able to distinguish the items at different positions, and then a plurality of target embedding vector matrixes corresponding to the same vector diagram are different from each other, and further, the different target embedding vector matrixes are respectively analyzed, so that the accuracy of the items recommended through the SR-GNN is improved.

Optionally, the session control sequence includes n items, the position information sequence includes n pieces of position information, the n pieces of position information correspond to the n items respectively, and a value of the position information corresponding to the item that is ranked earlier in the session control sequence is larger, and a value of the position information corresponding to the item that is ranked later in the session control sequence is smaller.

By enabling n piece of position information in the position information sequence to be descending values, the items in the session control sequence may correspond to the position information with different values, so that the embedding vectors of the items corresponds to the embedding vectors of different pieces of position information, the items arranged at different positions in the session control sequence may be distinguished in the summing process, thereby it is able to distinguish the target embedding vector matrixes corresponding to the same vector diagram, so that the accuracy of the items recommended through the SR-GNN is improved.

Optionally, the determining the recommended item based on the target embedding vector matrix and through the SR-GNN includes:

inputting the target embedding vector matrix into the SR-GNN to process the target embedding vector matrix, to obtain a triggering probability of each item in an item set related to the session control sequence, where the item set at least includes the items in the session control sequence;

determining an item recommendation list based on a value of the triggering probability of each item.

The target embedding vector matrix is input into SR-GNN for processing to obtain a triggering probability of each item in an item set related to the session control sequence, where the item set at least includes the items in the session control sequence; and an item recommendation list is determined according to the value of the triggering probability of each item, and recommended item set related to the session control sequence possibly selected by the user in the next step may be recommended in the item recommendation list, so as to avoid only recommending the items in the session control sequence, and improving the comprehensiveness of the session recommendation method.

Optionally, the inputting the target embedding vector matrix into the SR-GNN to process the target embedding vector matrix to obtain the triggering probability of each item in the item set related to the session control sequence includes:

inputting the target embedding vector matrix into the SR-GNN, to obtain a recommended score value of each item in the session control sequence;

calculating the recommended score value through a softmax function, to obtain the triggering probability of each item in the session control sequence.

The recommendation score value calculated by the SR-GNN through a softmax function is further calculated to obtain the trigger probability of each item clicked by the user, so that the recommended items obtained according to the trigger probability are more accurate.

Optionally, the embedding vector of each of the items is determined based on a first embedding look-up table, and the embedding vector of each piece of position information is determined based on a second embedding look-up table.

By inquiring the embedding vector of the item and the embedding vector of the position information by different embedding look-up tables, the condition that the same vector diagram corresponds to a plurality of target embedding vector matrixes due to the synchronization of a first embedding vector matrix and a second embedding vector matrix may be avoided, so that the accuracy of the items recommended through the SR-GNN is improved.

The embodiment in the above disclosure has the following advantages or benefits: the accuracy of the item recommended through the SR-GNN may be improved. By generating the position information corresponding to the arrangement sequence of the items in the session control sequence and obtaining the target embedding vector matrix according to the embedding vector matrix of the position information and the embedding vector matrix of the corresponding item, a plurality of target embedding vector matrices corresponding to the same vector diagram may be distinguished, so that the defect of low accuracy of the item recommended through the SR-GNN caused by the fact that the plurality of embedding vector matrices corresponding to the same vector diagram are regarded as the same embedding vector matrix is overcome, and the accuracy of the item recommended through the SR-GNN may be improved.

In a second aspect, a session recommendation device is provided in an embodiment of the present disclosure, including:

an acquiring module, configured to acquire a session control sequence and acquire a first embedding vector matrix based on an embedding vector of each of items in the session control sequence;

a generating module, configured to generate a position information sequence based on an arrangement sequence of the items in the session control sequence, and acquire a second embedding vector matrix based on an embedding vector of each piece of position information in the position information sequence;

a first determining module, configured to determine a target embedding vector matrix based on the first embedding vector matrix and the second embedding vector matrix; and a second determining module, configured to determine a recommended item, based on the target embedding vector matrix and through a Session-based Recommendation Graph Neural Network (SR-GNN).

Optionally, the first determining module is further configured to:

sum the first embedding vector matrix and the second embedding vector matrix to obtain the target embedding vector matrix; or splice the first embedding vector matrix and the second embedding vector matrix to obtain the target embedding vector matrix, where a dimension of the embedding vector corresponding to each item in the target embedding vector matrix is twice a dimension of the embedding vector corresponding to each item in the first embedding vector matrix.

Optionally, the session control sequence includes n items, the position information sequence includes n pieces of position information, the n pieces of position information correspond to the n items respectively, and a value of the position information corresponding to the item that is ranked earlier in the session control sequence is larger, and a value of the position information corresponding to the item that is ranked later in the session control sequence is smaller.

Optionally, the second determining module includes:

a processing unit, configured to input the target embedding vector matrix into the SR-GNN to process the target embedding vector matrix, to obtain a triggering probability of each item in an item set related to the session control sequence, where the item set at least includes the items in the session control sequence;

a determining unit, configured to determine an item recommendation list based on a value of the triggering probability of each item.

Optionally, the processing unit includes:

a first calculating sub-unit, configured to input the target embedding vector matrix into the SR-GNN, to obtain a recommended score value of each item in the session control sequence;

a second calculating sub-unit, configured to calculate the recommended score value through a softmax function, to obtain the triggering probability of each item in the session control sequence.

Optionally, the embedding vector of each of the items is determined based on a first embedding look-up table, and the embedding vector of each piece of position information is determined based on a second embedding look-up table.

In a third aspect, an electronic device is provided in an embodiment of the present disclosure, including:

at least one processor; and a memory communicatively coupled to the at least one processor; where the memory stores an instruction executable by the at least one processor, and the instruction is executed by the at least one processor to enable the at least one processor to perform the session recommendation method in the embodiment of the present disclosure.

In a fourth aspect, a non-transitory computer readable storage medium storing a computer instruction is provided in an embodiment of the present disclosure, where the computer instruction is configured to enable a computer to perform the session recommendation method in the embodiment of the present disclosure.

BRIEF DESCRIPTION OF THE DRAWINGS

The drawings are to provide a better understanding of the present disclosure and are not to be construed as limiting the present disclosure.

DETAILED DESCRIPTION

Exemplary embodiments of the present disclosure are described below with reference to the drawings, in which various details of embodiments of the present disclosure are included to assist the understanding, and which are to be considered as merely exemplary. Accordingly, those of ordinary skill in the art will recognize that various changes and modifications of the embodiments described herein may be made without departing from the scope and spirit of the disclosure. Also, descriptions of well-known functions and constructions are omitted in the following description for clarity and conciseness.

Figure 1:
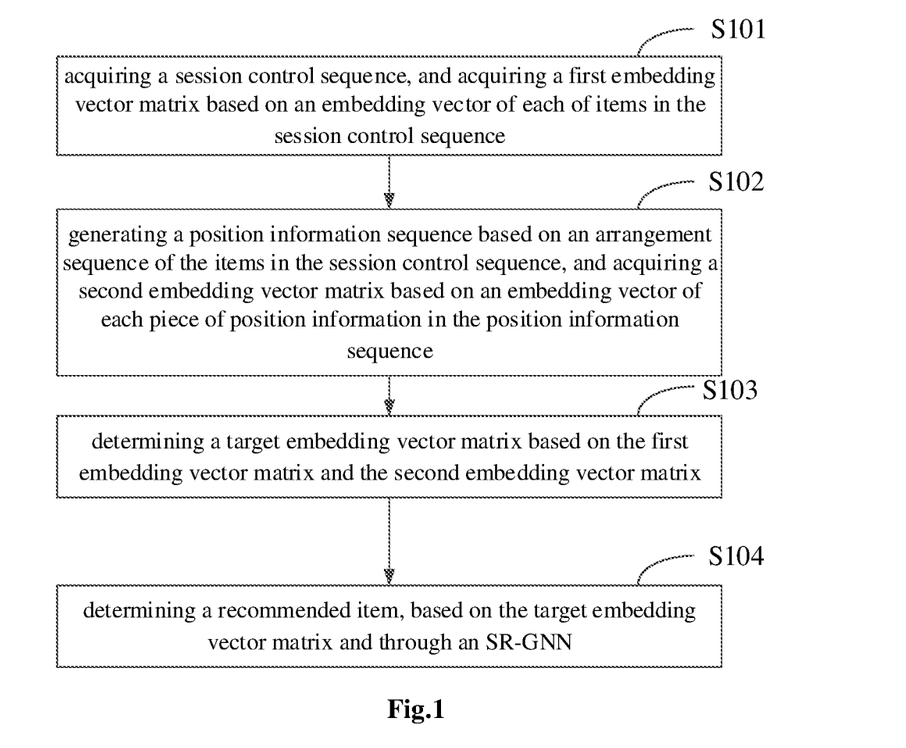
FIG. 1 is a flow diagram of a session recommendation method in an embodiment of the present disclosure.

As shown in FIG. 1, a session recommendation method is provided in an embodiment of the present disclosure, including:

S101: acquiring a session control sequence, and acquiring a first embedding vector matrix based on an embedding vector of each of items in the session control sequence.

The session control sequence may be a series of operations performed by the user, for example, multiple commodities clicked in sequence on a shopping website, the series of operations may be abstracted into an item sequences arranged in sequence, that is, the session control sequence, and each operation node of the user in the session control sequence corresponds to one item. In the session recommendation process, each session control sequence is modeled as a directed graph, where each node represents an item. Each edge of the directed graph means that a user has clicked in turn the item represented by the start and end points in this session.

Figure 2:
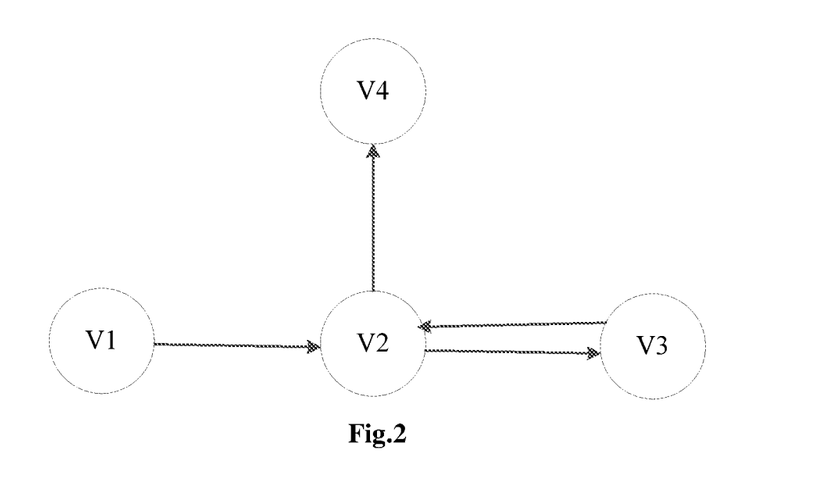
FIG. 2 is a schematic view of a directed graph of a session control sequence in an embodiment of the present disclosure.

For example: as shown in FIG. 2, when the user clicks on the commodities v1, v2, v3, v2 and v4 in sequence, the vector graph constructed by the Session is shown in FIG. 2.

In the graph representation of each Session, each item is embedded into a uniform embedding space, and a hidden vector of each item is indicated with the vector of each node. Each Session may be modeled as an embedding vector based on the vector representation of the nodes in the graph. In some embodiments, the graph neural network GNN may be used to determine an embedding vector (also referred to as an implicit vector or embedding vector) representation of each item, for example: inputting a Session to the GNN network, if the Session is expressed as: $S=[v\_(s,1), v\_(s,2), \ldots, v\_(s,n)]$, there are n non-repeated items in the Session, column: $[v\_1, v\_2, \ldots, v\_n]$, GNN network output $V \in R^{\wedge}(n*d)$ matrix, where the $i^{th}$ row in the matrix represents the embedding vector of $v\_i$, where d represents a dimension of the embedding vector, and R represents a real number.

S102: generating a position information sequence based on an arrangement sequence of the items in the session control sequence, and acquiring a second embedding vector matrix based on an embedding vector of each piece of position information in the position information sequence.

The position information sequence includes n pieces of position information, so as to correspond to n items in the session control sequence one by one, and one piece of position information corresponding to a certain item is used to indicate an arrangement position of the item in the session control sequence, for example: Session=[s1, s2, ..., sn], the position information sequence is (n−1, n−2, ..., 0), where n is the number of items in Session. In some embodiments, after determining the embedding vector of the item, an embedding query may be performed on the position information of the item to obtain an embedding vector of the position information of each item, so as to obtain a second embedding vector matrix. It should be noted that the embedding vector of the item is determined according to the first embedding look-up table (i.e., the first embedding look-up table), and the embedding vector of the position information is determined according to the second embedding look-up table (i.e., the second embedding look-up table), so that the embedding look-up table for the position information is different from the embedding look-up table for the item.

It should be noted that, in an implementation, the position information may be other values besides the real number whose value is sequentially decreased, for example, a position information of a sine-cosine scheme proposed in a Transformer (encoder).

S103: determining a target embedding vector matrix based on the first embedding vector matrix and the second embedding vector matrix.

In some embodiments, the first embedding vector matrix and the second embedding vector matrix may be summed to obtain a target embedding vector matrix, and certainly, the target embedding vector matrix may also be obtained by splicing the first embedding vector matrix and the second embedding vector matrix, as long as it is ensured that the embedding vector of each item in the first embedding vector matrix is associated with the arrangement position of the item in the Session through the second embedding vector matrix, which is not specifically limited herein.

The first embodiment of summing the first embedding vector matrix and the second embedding vector matrix to obtain the target embedding vector matrix may include: taking the matrix summation result of the first embedding vector matrix and the second embedding vector matrix as the target embedding vector matrix; the second embodiment of splicing the first embedding vector matrix and the second embedding vector matrix to obtain the target embedding vector matrix may include: when each row in the first embedding vector matrix represents an embedding vector of one item, the second embedding vector matrix may be spliced to the right side of the first embedding vector matrix, for example: if n items are included in one Session and a dimension of the embedding vector of each item is m, the first embedding vector matrix is an n×m matrix, the second embedding vector matrix is also an n×m matrix, the second embedding vector matrix is spliced on the right side of the first embedding vector matrix to obtain an n×2m matrix, and a dimension of the target embedding vector corresponding to each item is 2m.

Figure 3:
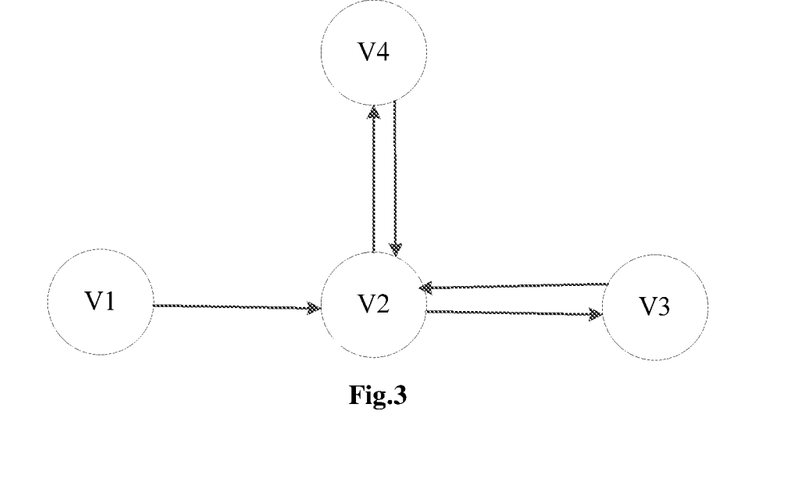
FIG. 3 is a schematic view of a directed graph of a session control sequence in another embodiment of the present disclosure.

The target embedding vector matrix is determined according to the first embedding vector matrix and the second embedding vector matrix, so that different sessions may be distinguished, and the problem of low accuracy of a recommendation result caused when a plurality of sessions corresponding to the same vector graph are regarded as the same Session for subsequent analysis and processing. For example: as shown in FIG. 3, the directed graph corresponds to two Session sequences, which are (1, 2, 3, 2, 4, 2) and (1, 2, 4, 2, 3, 2). This also means that for these two different sequences, the SR-GNN will treat the two different sequences as the same Session to process, whether in the training or prediction phase in the related art, thereby resulting in low accuracy of the recommendation result. In fact, for a given directed graph, all of its corresponding Session sequences are all of the feasible Euler paths of the directed graph.

S104: determining a recommended item, based on the target embedding vector matrix and through a Session-based Recommendation Graph Neural Network (SR-GNN).

In some embodiments, the SR-GNN calculation model may calculate recommendation scores of the respective items by inputting the target embedding vector matrix into the SR-GNN calculation model, and then may calculate probability values of different items, that is, probabilities of items that may be clicked next by the user, by using the softmax function and already obtained recommendation score values, so as to recommend the items according to the probability values of respective items being clicked, for example: recommending one or more items with the highest probability value of being clicked.

The embodiment in the above disclosure has the following advantages or benefits: the accuracy of the item recommended through the SR-GNN may be improved. By generating the position information corresponding to the arrangement sequence of the items in the session control sequence and obtaining the target embedding vector matrix according to the embedding vector matrix of the position information and the embedding vector matrix of the corresponding item, a plurality of target embedding vector matrices corresponding to the same vector diagram may be distinguished, so that the defect of low accuracy of the item recommended through the SR-GNN caused by the fact that the plurality of embedding vector matrices corresponding to the same vector diagram are regarded as the same embedding vector matrix is overcome, and the accuracy of the item recommended through the SR-GNN may be improved.

Figure 4:
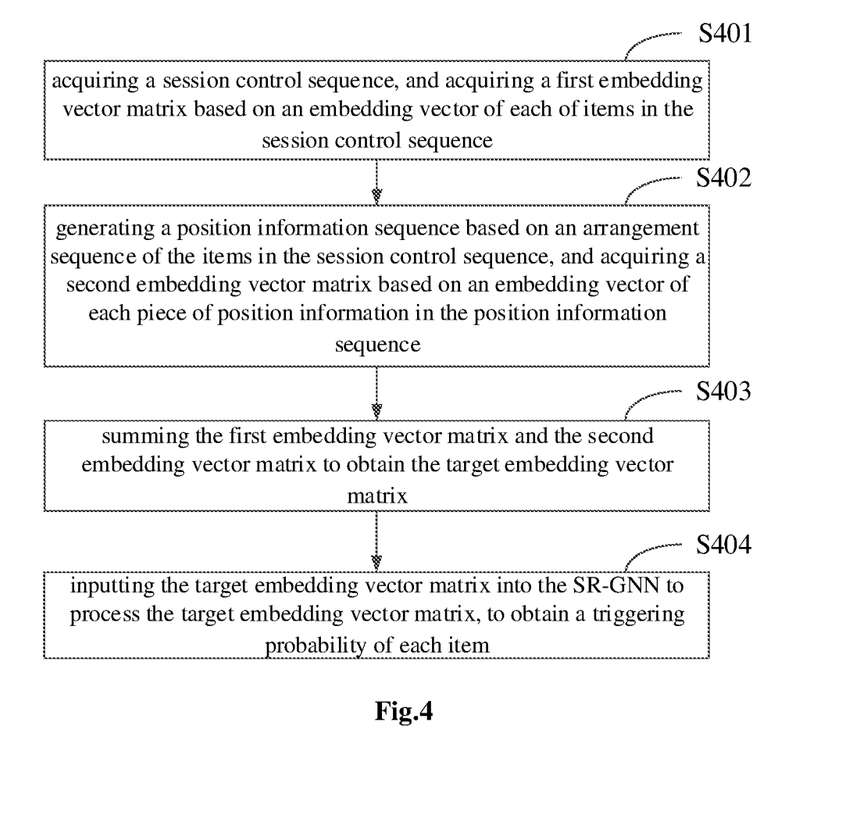
FIG. 4 is a flow diagram of a session recommendation method in another embodiment of the present disclosure.

As shown in FIG. 4, another session recommendation method is provided in an embodiment of the present disclosure, including:

S401: acquiring a session control sequence, and acquiring a first embedding vector matrix based on an embedding vector of each of items in the session control sequence.

S402: generating a position information sequence based on an arrangement sequence of the items in the session control sequence, and acquiring a second embedding vector matrix based on an embedding vector of each piece of position information in the position information sequence.

In some embodiments, the session control sequence includes n items, the position information sequence includes n pieces of position information, and the n pieces of position information respectively correspond to the n items.

S403: summing the first embedding vector matrix and the second embedding vector matrix to obtain the target embedding vector matrix.

Optionally, the n pieces of position information may be n real numbers in a descending order, and in this embodiment, a value of the position information corresponding to the item that is ranked earlier in the session control sequence is larger, and a value of the position information corresponding to the item that is ranked later in the session control sequence is smaller, so that the item at each position in the session control sequence corresponds to different position information values. In addition, for the position information with different values, and the embedding vectors thereof obtained by the inquiry of the embedding layer are different, so that a second embedding vector matrix capable of distinguishing the arrangement positions of all items in the session control sequence may be obtained. By summing the first embedding vector matrix and the second embedding vector matrix to obtain the target embedding vector matrix, a plurality of target embedding vector matrices corresponding to the same vector diagram may be made different from each other, then in the subsequent analysis and calculation process, the target embedding vector matrices are respectively analyzed, so that the accuracy of the SR-GNN analysis results is improved.

By enabling n piece of position information in the position information sequence to be descending values, the items in the session control sequence may correspond to the position information with different values, so that the embedding vectors of the items corresponds to the embedding vectors of different pieces of position information, the items arranged at different positions in the session control sequence may be distinguished in the summing process, thereby it is able to distinguish the target embedding vector matrixes corresponding to the same vector diagram, so that the accuracy of the items recommended through the SR-GNN is improved.

S404: inputting the target embedding vector matrix into the SR-GNN to process the target embedding vector matrix, to obtain a triggering probability of each item in an item set related to the session control sequence, where the item set at least includes the items in the session control sequence.

In some embodiments, there may also be other items in the item set that are not included in the session control sequence, for example, the online shopping mall has 100 commodities, and when the user clicks only 10 commodities, the target embedding vector matrix is input into the SR-GNN for processing, and then the trigger probabilities of the 100 commodities are output, where the trigger probability of the commodity may be understood as a probability value that the user may click the commodity next.

S405: determining an item recommendation list based on a value of the triggering probability of each item.

In some embodiments, any number of items such as the first 5 or the first 10 items with the largest trigger probability value may be recommended in the item recommendation list, or an item with a trigger probability greater than a preset probability value may be recommended in the item recommendation list.

The above embodiment was verified using the Digenetica dataset and the Yoochoose dataset, and the results are as follows:

a comparison of the P @20 index values on the test set is shown in Table 1 below:

TABLE 1

| dataset | P@20 index value of SR-GNN | P@20 index value of SR-GNN-PE |
|---|---|---|
| Diginetica | 50.73 | 51.32 |
| Yoochoose | 71.36 | 71.47 |

In the test process, the hyper-parameters in the SR-GNN and the SR-GNN-PE are aligned, and the conclusion is based on the average value obtained by five times of tests. In addition, the P @20 index value of the SR-GNN indicates the P@20 index value of the SR-GNN recommendation result without using the position information sequence, the P @20 index value of the SR-GNN-PE indicates the P @20 index value of the SR-GNN recommendation result using the position information sequence, and the higher the P @20 index value is, the higher the accuracy of the test result is.

As may be seen from the above table, after the position information is added, the accuracy of the SR-GNN recommendation result is obviously improved.

The target embedding vector matrix is input into SR-GNN for processing to obtain a triggering probability of each item in an item set, and an item recommendation list is determined according to the value of the triggering probability of each item, and one or more items possibly selected by the user in the next step may be recommended in the item recommendation list, so as to avoid only recommending the items in the session control sequence, and improving the comprehensiveness of the session recommendation method.

Figure 5:
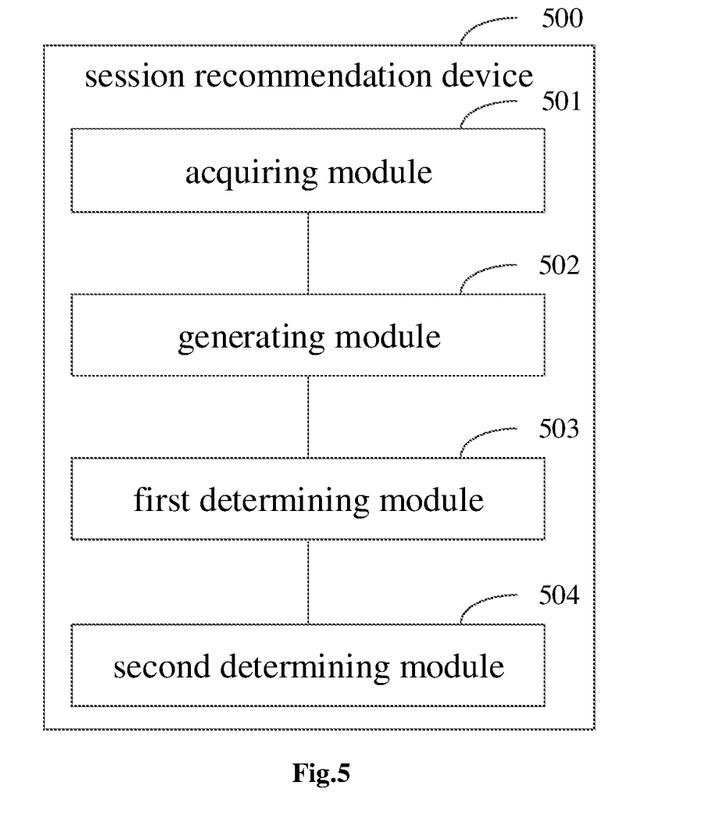
FIG. 5 is a block diagram of a session recommendation device used to implement a session recommendation method in an embodiment of the present disclosure.

As shown in FIG. 5, a session recommendation device 500 is further provided in one embodiment, including:
an acquiring module 501, configured to acquire a session control sequence and acquire a first embedding vector matrix based on an embedding vector of each of items in the session control sequence;
a generating module 502, configured to generate a position information sequence based on an arrangement sequence of the items in the session control sequence, and acquire a second embedding vector matrix based on an embedding vector of each piece of position information in the position information sequence;
a first determining module 503, configured to determine a target embedding vector matrix based on the first embedding vector matrix and the second embedding vector matrix; and
a second determining module 504, configured to determine a recommended item, based on the target embedding vector matrix and through a Session-based Recommendation Graph Neural Network (SR-GNN).

In one embodiment, the first determining module is further configured to:
sum the first embedding vector matrix and the second embedding vector matrix to obtain the target embedding vector matrix.

In one embodiment, the first determining module is further configured to:
splice the first embedding vector matrix and the second embedding vector matrix to obtain the target embedding vector matrix, where a dimension of the embedding vector corresponding to each item in the target embedding vector matrix is twice a dimension of the embedding vector corresponding to each item in the first embedding vector matrix.

Further, the session control sequence includes n items, the position information sequence includes n pieces of position information, the n pieces of position information correspond to the n items respectively, and a value of the position information corresponding to the item that is ranked earlier in the session control sequence is larger, and a value of the position information corresponding to the item that is ranked later in the session control sequence is smaller.

In one embodiment, the second determining module 504 includes:
a processing unit, configured to input the target embedding vector matrix into the SR-GNN to process the target embedding vector matrix, to obtain a triggering probability of each item in an item set related to the session control sequence, where the item set at least includes the items in the session control sequence;
a determining unit, configured to determine an item recommendation list based on a value of the triggering probability of each item.

Further, the processing unit includes:
a first calculating sub-unit, configured to input the target embedding vector matrix into the SR-GNN, to obtain a recommended score value of each item in the session control sequence;
a second calculating sub-unit, configured to calculate the recommended score value through a softmax function, to obtain the triggering probability of each item in the session control sequence.

In one embodiment, the embedding vector of each of the items is determined based on a first embedding look-up table, and the embedding vector of each piece of position information is determined based on a second embedding look-up table.

The session recommendation device in each embodiment is a device for implementing the session recommendation method in each embodiment, and the technical features are corresponding, and the technical effects are corresponding, which are not described herein again.

According to an embodiment of the present disclosure, an electronic device and a readable storage medium are provided in the present disclosure.

Figure 6:
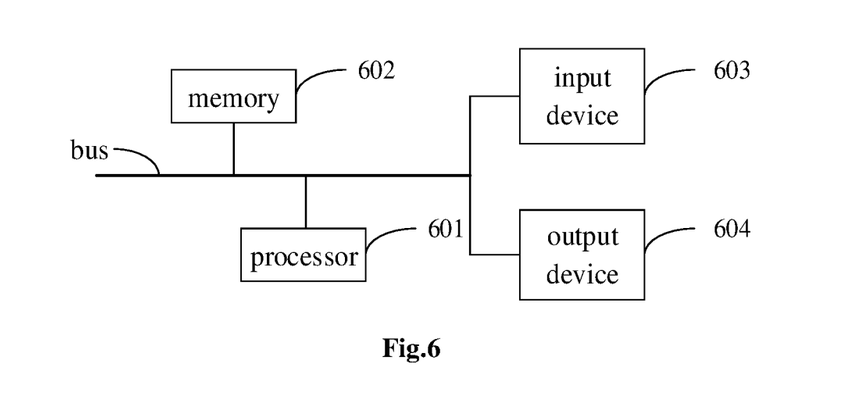
FIG. 6 is a block diagram of an electronic device that may implement a session recommendation method in an embodiment of the present disclosure.

As shown in FIG. 6 which is a block diagram of an electronic device of a session recommendation method according to an embodiment of the present disclosure. Electronic devices are intended to represent various forms of digital computers, such as laptops, desktops, workstations, personal digital assistants, servers, blade servers, mainframes, and other appropriate computers. Electronic devices may also represent various forms of mobile devices, such as personal digital processors, cellular telephones, smart phones, wearable devices, and other similar computing devices. The components shown herein, their connections and relationships, and their functions, are meant to be examples only, and are not intended to limit implementations of the disclosure described and/or claimed herein.

As shown in FIG. 6, the electronic device includes: one or more processors 601, memory 602, and interfaces for connecting the various components, including high-speed interfaces and low-speed interfaces. The various components are interconnected using different buses and may be mounted on a common motherboard or in other manners as desired. The processor may process instructions for execution within the electronic device, including instructions stored in or on the memory to display graphical information of a GUI on an external input/output device (such as a display device coupled to the interface). In other embodiments, multiple processors and/or multiple buses may be used, along with multiple memories and multiple memories, if desired. Also, multiple electronic devices may be connected, with each device providing some of the necessary operations (e.g., as an array of servers, a group of blade servers, or a multi-processor system). One processor 601 is illustrated in FIG. 6.

The memory 602 is a non-transitory computer readable storage medium provided by the present disclosure. Where the memory stores instructions executable by the at least one processor to cause the at least one processor to perform a session recommendation method provided by the present disclosure. A non-transitory computer-readable storage medium of the present disclosure stores computer instructions for causing a computer to execute a session recommendation method provided by the present disclosure.

The memory 602, which is a non-transitory computer-readable storage medium, may be used to store non-transitory software programs, non-transitory computer-executable programs, and modules, such as program instructions/modules corresponding to the session recommendation method in the disclosed embodiments (e.g., the generation module 501, the first determination module 502, and the second determination module 503 shown in FIG. 5). The processor 601 executes various functional applications of the server and data processing, i.e., implementing the session method in the above method embodiments, by running non-transitory software programs, instructions, and modules stored in the memory 602.

The memory 602 may include a storage program area and a storage data area, where the storage program area may store an operating system, an application program required for at least one function; the storage data area may store data created according to the use of the electronic device recommended by the session, and the like. Further, the memory 602 may include high speed random access memory, and may also include non-transitory memory, such as at least one magnetic disk storage device, flash memory device, or other non-transitory solid state storage device. In some embodiments, the memory 602 may optionally include memory remotely located from the processor 601, and such remote memory may be connected to the session recommendation electronic device via a network. Examples of such networks include, but are not limited to, the internet, intranets, local area networks, mobile communication networks, and combinations thereof.

The electronic device of the session recommendation method may further include: an input device 603 and an output device 604. The processor 601, the memory 602, the input device 603, and the output device 604 may be connected by a bus or other means, and are exemplified by being connected by a bus in FIG. 6.

The input device 603 may receive input numeric or character information and generate key signal inputs related to user settings and function control of the electronic device for session recommendation, for example, a touch screen, keypad, mouse, track pad, touch pad, pointing stick, one or more mouse buttons, track ball, joystick, or other input device. The output devices 604 may include a display device, auxiliary lighting devices (e.g., LEDs), and tactile feedback devices (e.g., vibrating motors), among others. The display device may include, but is not limited to, a Liquid Crystal Display (LCD), a Light Emitting Diode (LED) display, and a plasma display. In some implementations, the display device may be a touch screen.

Various implementations of the systems and techniques described here may be realized in digital electronic circuitry, integrated circuitry, application specific ASICs (application specific integrated circuits), computer hardware, firmware, software, and/or combinations thereof. These various embodiments may include: implemented in one or more computer programs that are executable and/or interpretable on a programmable system including at least one programmable processor, which may be special or general purpose, receiving data and instructions from, and transmitting data and instructions to, a storage system, at least one input device, and at least one output device.

These computer programs (also known as programs, software applications, or code) include machine instructions for a programmable processor, and may be implemented using high-level procedural and/or object-oriented programming languages, and/or assembly/machine languages. As used herein, the terms "machine-readable medium" and "computer-readable medium" refer to any computer program product, device, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having: a display device (e.g., a CRT (cathode ray tube) or LCD (liquid crystal display) monitor) for displaying information to a user; and a keyboard and a pointing device (e.g., a mouse or a trackball) by which a user may provide input to the computer. Other kinds of devices may also be used to provide for interaction with a user; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a user computer having a graphical user interface or a web browser through which a user can interact with an implementation of the systems and techniques described here), or any combination of such back-end, middleware, or front-end components. The components of the system may be interconnected by any form or medium of digital data communication (e.g., a communication network). Examples of communication networks include: local Area Networks (LANs), Wide Area Networks (WANs), and the Internet.

The computer system may include clients and servers. A client and server are generally remote from each other and typically interact through a communication network. The relationship of client and server arises by virtue of computer programs running on the respective computers and having a client-server relationship to each other.

According to the technical scheme of the embodiment of the disclosure, the accuracy of the item recommended through the SR-GNN may be improved. By generating the position information corresponding to the arrangement sequence of the items in the session control sequence and obtaining the target embedding vector matrix according to the embedding vector matrix of the position information and the embedding vector matrix of the corresponding item, a plurality of target embedding vector matrices corresponding to the same vector diagram may be distinguished, so that the defect of low accuracy of the item recommended through the SR-GNN caused by the fact that the plurality of embedding vector matrices corresponding to the same vector diagram are regarded as the same embedding vector matrix is overcome, and the accuracy of the item recommended through the SR-GNN may be improved.

It should be understood that various forms of the flows shown above, reordering, adding or deleting steps, may be used. For example, the steps described in the present disclosure may be executed in parallel, sequentially, or in different orders, and are not limited herein as long as the desired results of the technical solutions disclosed in the present disclosure may be achieved.

The above detailed description should not be construed as limiting the scope of the disclosure. It should be understood by those skilled in the art that various modifications, combinations, sub-combinations and substitutions may be made, depending on design requirements and other factors. Any modification, equivalent replacement, and improvement made within the spirit and principle of the present disclosure should be included in the scope of the present disclosure.

What is claimed is:

1. A session recommendation method, comprising:
  acquiring, by an electronic device, a session control sequence having items, and acquiring a first embedding vector matrix based on an embedding vector of each of the items in the session control sequence; wherein the session control sequence is an item sequence abstracted from n items being clicked by a user in a first order on a website;
  generating, by the electronic device, a position information sequence based on an arrangement sequence of the items in the session control sequence, and acquiring a second embedding vector matrix based on an embedding vector of each piece of position information in the position information sequence; wherein the position information sequence comprises n pieces of position information, the n pieces of position information correspond to the n items respectively, and values of the n pieces of position information gradually decrease in the first order;
  determining, by the electronic device, a target embedding vector matrix based on the first embedding vector matrix and the second embedding vector matrix; and
  determining, by the electronic device, a recommended item, based on the target embedding vector matrix and through a Session-based Recommendation Graph Neural Network (SR-GNN);
  wherein determining by the electronic device the recommended item based on the target embedding vector matrix and through the SR-GNN comprises:
  splicing, by the electronic device, the first embedding vector matrix and the second embedding vector matrix to obtain the target embedding vector matrix, wherein a dimension of the embedding vector corresponding to each item in the target embedding vector matrix is twice a dimension of the embedding vector corresponding to each item in the first embedding vector matrix;
  wherein the determining by the electronic device the recommended item based on the target embedding vector matrix and through the SR-GNN comprises:
  inputting, by the electronic device, the target embedding vector matrix into the SR-GNN to process the target embedding vector matrix, to obtain a triggering probability of each item in an item set related to the session control sequence, wherein the item set comprises the n items and other items than the n items on the website;
  determining, by the electronic device, an item recommendation list based on a value of the triggering probability of each item in the item set.

2. The method according to claim 1, wherein inputting the target embedding vector matrix into the SR-GNN to process the target embedding vector matrix to obtain the triggering probability of each item in the item set related to the session control sequence comprises:
  inputting the target embedding vector matrix into the SR-GNN to obtain a recommended score value of each item in the session control sequence;
  calculating the recommended score value through a softmax function to obtain the triggering probability of each item in the session control sequence.

3. The method according to claim 1, wherein embedding vector of each of the items is determined based on a first embedding look-up table, and the embedding vector of each piece of position information is determined based on a second embedding look-up table.

4. An electronic device, comprising:
  at least one processor; and
  a memory communicatively coupled to the at least one processor; wherein
  the memory stores instructions executable by the at least one processor, and the instructions are executed by the at least one processor to enable the at least one processor to:
  acquire a session control sequence having items and acquire a first embedding vector matrix based on an embedding vector of each of the items in the session control sequence; wherein the session control sequence is an item sequence abstracted from n items being clicked by a user in a first order on a website;
  generate a position information sequence based on an arrangement sequence of the items in the session control sequence, and acquire a second embedding vector matrix based on an embedding vector of each piece of position information in the position information sequence; wherein the position information sequence comprises n pieces of position information, the n pieces of position information correspond to the n items respectively, and values of the n pieces of position information gradually decrease in the first order;
  determine a target embedding vector matrix based on the first embedding vector matrix and the second embedding vector matrix; and
  determine a recommended item, based on the target embedding vector matrix and through a Session-based Recommendation Graph Neural Network (SR-GNN);
  wherein the instructions are executed by the at least one processor to enable the at least one processor to:
  splice the first embedding vector matrix and the second embedding vector matrix to obtain the target embedding vector matrix, wherein a dimension of the embedding vector corresponding to each item in the target embedding vector matrix is twice a dimension of the embedding vector corresponding to each item in the first embedding vector matrix;
  wherein the instructions are executed by the at least one processor to enable the at least one processor to:

input the target embedding vector matrix into the SR-GNN to process the target embedding vector matrix, to obtain a triggering probability of each item in an item set related to the session control sequence, wherein the item set at least comprises the items in the session control sequence;

determine an item recommendation list based on a value of the triggering probability of each item.

5. The electronic device according to claim 4, wherein the instructions are executed by the at least one processor to enable the at least one processor to:

input the target embedding vector matrix into the SR-GNN, to obtain a recommended score value of each item in the session control sequence;

calculate the recommended score value through a softmax function, to obtain the triggering probability of each item in the session control sequence.

6. The electronic device according to claim 4, wherein the embedding vector of each of the items is determined based on a first embedding look-up table, and the embedding vector of each piece of position information is determined based on a second embedding look-up table.

7. A non-transitory computer readable storage medium storing a computer instruction, wherein the computer instruction is configured to enable a computer to perform the session recommendation method according to claim 1.

* * * * *